United States Patent
Cis et al.

(10) Patent No.: US 10,400,932 B2
(45) Date of Patent: Sep. 3, 2019

(54) HYDRAULIC PLUG

(71) Applicant: Delavan Inc., Des Moines, IA (US)

(72) Inventors: Marcin Cis, Lutynia (PL); Piotr Sawicki, Bogdaniec (PL)

(73) Assignee: DELAVAN INC., Des Moines, IA (US)

( * ) Notice: Subject to any disclaimer, the term of this patent is extended or adjusted under 35 U.S.C. 154(b) by 0 days.

(21) Appl. No.: 15/789,201

(22) Filed: Oct. 20, 2017

(65) Prior Publication Data

US 2018/0112811 A1  Apr. 26, 2018

(30) Foreign Application Priority Data

Oct. 21, 2016  (EP) ..................... 16461564

(51) Int. Cl.
*F16L 55/10* (2006.01)
*F16L 55/13* (2006.01)
*B65D 39/12* (2006.01)

(52) U.S. Cl.
CPC ............. *F16L 55/13* (2013.01); *B65D 39/12* (2013.01)

(58) Field of Classification Search
CPC .... F16L 55/13; Y10T 29/49938; B65D 39/12; B65D 59/02; B65F 39/12; B65F 59/02
USPC ......... 138/89; 220/233, 234; 411/72, 45, 69; 29/522.1
See application file for complete search history.

(56) References Cited

U.S. PATENT DOCUMENTS

| | | | |
|---|---|---|---|
| 1,031,446 A | 7/1912 | Hoffman | |
| 2,821,323 A * | 1/1958 | Lee, II | F16L 55/13 220/233 |
| 3,525,365 A | 8/1970 | Meulendyk et al. | |
| 3,825,146 A | 7/1974 | Hirmann | |
| 4,390,042 A * | 6/1983 | Kucherer | F16L 55/13 138/89 |
| 4,865,080 A * | 9/1989 | Lundquist | B25B 27/0007 138/89 |

(Continued)

FOREIGN PATENT DOCUMENTS

FR   912011 A    7/1946
FR   2795799 A1  1/2001

OTHER PUBLICATIONS

European Search Report for Application No. 16461564.3-1709, dated Feb. 1, 2017, 7 pages.

(Continued)

*Primary Examiner* — Patrick F Brinson
(74) *Attorney, Agent, or Firm* — Cantor Colburn LLP

(57) ABSTRACT

A method of manufacturing a hydraulic plug includes providing a shell comprising a circumferential wall, a sealed end, an open end and a cylindrical cavity opening to the open end is provided. The open end of the shell is wider externally than the sealed end. A head of an expander is inserted into the cavity. The head of the expander has a convex contact surface which is rounded in an axial direction (A) of the cavity. A region of the shell adjacent its open end is plastically deformed causing material from the circumferential wall of the shell to be displaced radially inward around the head of the expander to form a constricted opening retaining the expander within the cavity. The deforming reshapes an internal surface of the cavity from a cylindrical to a non-linear shaped ramp leading up to a constricted opening.

17 Claims, 7 Drawing Sheets

(56) References Cited

U.S. PATENT DOCUMENTS

| | | | | |
|---|---|---|---|---|
| 5,078,294 | A | * | 1/1992 | Staubli ............... F16B 13/065 220/233 |
| 5,160,226 | A | | 11/1992 | Lee |
| 5,779,085 | A | * | 7/1998 | Havlinek ............... F16L 55/11 215/361 |
| 6,003,557 | A | | 12/1999 | Brelig et al. |
| 7,631,664 | B1 | * | 12/2009 | Mailand ............ F16L 55/1108 138/89 |
| 2015/0202754 | A1 | | 7/2015 | Kirilichin et al. |
| 2016/0069370 | A1 | * | 3/2016 | Jiang ............... F16B 19/1054 411/510 |

OTHER PUBLICATIONS

Short Series 11mm Betaplug Expansion Plug , The Lee Company [online]; [retrieved on Jan. 9, 2018];http://leeimh.com/products/lee-betaplugs/short-series-betaplug-expansion-plug/short-series-11mm-betaplug-expansion-plug/, 3 Pages.
Short Series 13mm Betaplug Expansion Plug , The Lee Company [online]; [retrieved on Jan. 9, 2018];http://leeimh.com/products/lee-betaplugs/short-series-betaplug-expansion-plug/short-series-13mm-betaplug-expansion-plug/, 3 Pages.
Short Series 16mm Betaplug Expansion Plug, The Lee Company [online]; [retrieved on Jan. 9, 2018];http://leeimh.com/products/lee-betaplugs/short-series-betaplug-expansion-plug/short-series-16mm-betaplug-expansion-plug/, 3 Pages.
Short Series 7mm Betaplug Expansion Plug , The Lee Company [online]; [retrieved on Jan. 9, 2018]; http://leeimh.com/products/lee-betaplugs/short-series-betaplug-expansion-plug/short-series-7mm-betaplug-expansion-plug/, 3 Pages.
Short Series 9mm Betaplug Expansion Plug , The Lee Company [online]; [retrieved on Jan. 9, 2018]; http://leeimh.com/products/lee-betaplugs/short-series-betaplug-expansion-plug/short-series-9mm-betaplug-expansion-plug/, 3 Pages.
Short Series Betaplug Expansion Plug, The Lee Company [online]; [retrieved on Jan. 9, 2018]; http://leeimh.com/products/lee-betaplugs/short-series-betaplug-expansion-plug/, 2 Pages.
Short Series Betaplug Installation , The Lee Company [online]; [retrieved on Jan. 9, 2018];http://leeimh.com/products/lee-betaplugs/short-series-betaplug-expansion-plug/short-series-betaplug-installation/, 5 Pages.
The Lee Company, Lee Plugs Catalog [online]; [retrieved on Jan. 9, 2018];http://leecat.theleeco.com/ecatalog/lee-plugs/en, 1 Page.

* cited by examiner

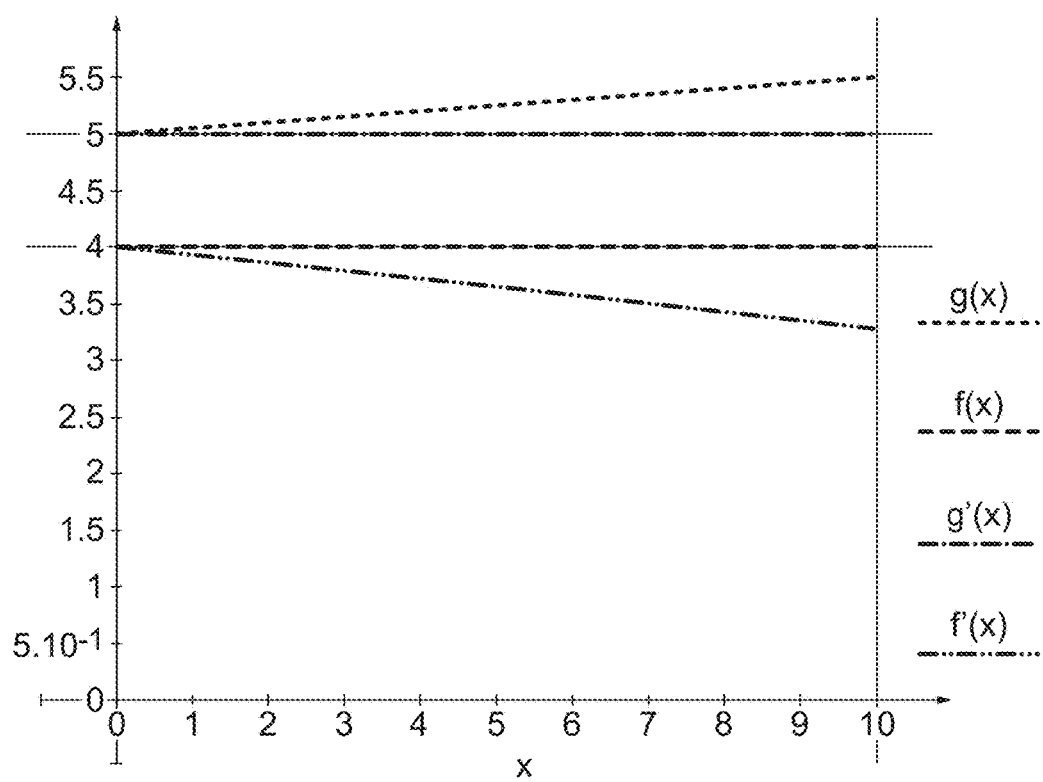

HYDRAULIC PLUG

FOREIGN PRIORITY

This application claims priority to European Patent Application No. 16461564.3 filed Oct. 21, 2016, the entire contents of which is incorporated herein by reference.

FIELD

The present disclosure relates to a method of manufacturing a hydraulic plug, a hydraulic plug and a method of sealing a passage with a hydraulic plug.

BACKGROUND

In many hydraulic devices, holes in hydraulic galleries have to be sealed off. Usually, a hydraulic plug is used to do this which can take several forms.

In one known example, a tapered hole is reamed in a passage to precise dimensions and a tapered plug is pushed in to seal the passage. The plug can comprise two parts, namely a shell which seals against the internal surface of the passage and an expander (often referred to as a "pin") which is driven into the shell by a driver tool. The expander acts as a wedge to expand the shell within the passage to seal it off.

In this first known arrangement, the shell comprises a circumferential wall of uniform thickness that has a tapered surface, both externally and internally, and a sealed end. The reamed taper of the passage, the taper of the outer surface of the shell, the taper of the inner surface of the shell and the taper of the circumferential surface of the expander, are substantially the same. In this way, when the expander is driven into the shell, the tapered outer surface of the shell seals against the reamed taper of the passage and the expander becomes wedged within the tapered cavity of the shell.

Such hydraulic plugs are described in U.S. Pat. No. 5,160,226 and are available from The Lee Company (see http://www.leeimh.com/metal/betaplug-expansion-plugs/betaplug-expansion-plug-SBP.htm for details).

In another known example, a hole of constant diameter is reamed in a passage. The transition between the reamed diameter and the passage diameter provides a step that a plug can be pushed up against during installation. As with the previous example, the hydraulic plug comprises a shell with an internal expander ("pin"). With the shell in place within the reamed part of the passage pushed up against the step, the expander can be driven into the shell's cavity to wedge the hydraulic plug in place, sealing it against the internal surface of the passage.

Hydraulic plugs of this type are also available from The Lee Company (see http://leecat.theleeco.com/ecatalog/lee-plugs/en for details).

Currently, all of these types of hydraulic plugs, while they work well and have a proven track record, they require some axial force to be applied during installation within a passage of the hydraulic gallery. As a result, the design of the component has to take into consideration that such axial forces during installation need to be balanced, not just externally but also internally. This is particularly the case where the plug engages an internal step in the passage and axial load, which counters the axial force of the expander being driven into the shell, is transferred to the plug e.g., via the corner region of the internal step between the different bore diameters. This can lead to design complexity as well as sometimes to problems of material cracking during installation. In addition, there are the additional process steps of having to ream a tapered hole or hole of larger diameter and the associated problems of removing waste from such a reaming process.

Other hydraulic plug arrangements are described in U.S. Pat. Nos. 3,825,146, 6,003,557 and US-A-2015/0202754.

It is also known from U.S. Pat. No. 3,525,365 to provide a hydraulic plug in the form of a pre-assembled cylindrical shell with a tapered bore and a frusto-conical expander. The shell can be held while the expander is pulled via a stem against a constriction in the shell. The stem comprises a weakened region which is configured to break when a predetermined force is applied to the stem. In one configuration, an open end of the shell and a base of the expander faces the pressure-side within the passage; in another, the shell is turned around relative to the frusto-conical surface of the expander so as to present a sealed end of the shell towards the pressure-side of the passage. In both cases, the tapered internal surface of the bore and the counter tapered surface of the expander match so that the expander becomes wedged along its entire length within the shell to secure the hydraulic plug within the passage.

The present disclosure can be seen to offer an improvement to the hydraulic plugs described in U.S. Pat. No. 3,525,365.

SUMMARY

Viewed from one aspect, the present disclosure can be seen to provide a method of manufacturing a hydraulic plug comprising: providing a shell, the shell comprising a circumferential wall, a sealed end, an open end and a cylindrical cavity opening to the open end, the open end of the shell being wider externally than the sealed end; and inserting a head of an expander into the cavity, the expander further comprising a stem that extends out from the cavity for applying a tensile force to the head, the method being characterised by: in the step of inserting a head of an expander, the expander has a convex contact surface which is rounded in an axial direction of the cavity; and plastically deforming a region of the shell adjacent its open end, to form a constricted opening retaining the head of the expander within the cavity.

The head of the expander may comprise, for example, a ball or bullet shaped member. The head of the expander may comprise a spherical member for example.

The plastically deforming may cause material from the circumferential wall of the shell to be displaced radially inward around the head of the expander, reshaping an internal surface of the cavity to create a ramp on the sealed end side of the constricted opening for the expander to engage. The internal surface of the cavity may be reshaped to be non-linear in the axial direction. The plastically deforming may even result in an internal surface which tapers progressively towards the constricted opening such that a rate of change of r/x, where r is an internal radius of the cavity and x is displacement along an axis from the sealed end of the shell to the open end, increases towards the constricted opening.

The shell may be provided with a frusto-conical outer surface prior to deforming. The deforming may produce a substantially cylindrical hydraulic plug, for example, where the outer diameter ODx along an axis of the hydraulic plug satisfies the equation ODx≤OD1 where OD1 is the outer diameter of the sealed end.

The plastically deforming may comprise rolling or clamping a region adjacent the open end of the shell.

The plastically deforming may form a counter ramp of material on the open side of the constricted opening to bolster the constricted opening.

The internal surface of the cavity may be deformed to follow an outer surface of the head of the expander. It may follow a spherical outer surface of the head of the expander for example.

Viewed from another aspect, the present disclosure can be seen to provide a hydraulic plug comprising: a shell comprising a circumferential wall, a sealed end, an open end and a cavity opening to the open end, the open end having been constricted through plastic deformation to form a constricted opening; an expander having a head retained within the cavity of the shell by the constricted opening, the expander comprising a stem joined to the head, to which a tensile force can be applied to expand a region of the shell when the plug is being installed in a passage, characterised in that the head of the expander has a convex contact surface that is rounded in an axial direction of the cavity for applying pressure to an internal surface of the cavity.

The head of the expander may comprise a ball or bullet shaped member. The head of the expander may comprise a spherical member for example.

The cavity may be provided with a ramp on the sealed end side of the constricted opening for the head of the expander to engage, resulting from the plastic deformation of the open end.

The ramp may define an internal surface of the cavity which is non-linear in the axial direction. This may provide a progressively converging approach surface to the constricted opening within the cavity for the head of the expander to engage.

The ramp may define an internal surface which tapers progressively towards the constricted opening such that a rate of change of r/x, where r is an internal radius of the cavity and x is displacement along an axis from the sealed end of the shell to the open end, increases towards the constricted opening.

The shell may have a substantially cylindrical outer surface. The outer diameter ODx along an axis of the hydraulic plug may satisfy the equation ODx≤OD1 where OD1 is the outer diameter of the sealed end.

The expander and the ramp may be configured to make a ring of contact that corresponds to less than 50% of an axial extent of the head of the expander.

The open end of the shell may have been formed to provide a flattened ring-shaped surface for applying a counter tensile load to a tool.

Viewed from a further aspect, the present disclosure can be seen to provide a hydraulic gallery that has been sealed by a hydraulic plug as described above. It can also be seen to provide a hydraulic device comprising a hydraulic gallery that has been sealed by a hydraulic plug as described above.

Viewed from yet a further aspect, the present disclosure can be seen to provide a further method of manufacturing a hydraulic plug. The method comprises: providing a shell, the shell comprising a circumferential wall, a sealed end, an open end and a cylindrical cavity opening to the open end, the open end of the shell being wider externally than the sealed end; and inserting a head of an expander into the cavity, the expander comprising a stem that extends out from the cavity for applying a tensile force to the head. The method is characterised by plastically deforming a region of the shell adjacent its open end, causing material from the circumferential wall of the shell to be displaced radially inward around the head of the expander, the deforming also reshaping an internal surface of the cavity from a cylindrical to a non-linear shape defining a constricted opening with, internally, a ramp providing a progressively converging approach surface for the head of the expander to be pulled against.

Viewed from yet another aspect, the present disclosure can be seen to provide a hydraulic plug comprising: a shell comprising a circumferential wall, a sealed end, an open end and a cavity opening to the open end, the opening having been constricted through deformation; an expander having a head retained within the cavity of the shell by the constricted opening, the expander also comprising a stem joined to the head, to which a tensile force can be applied to expand a region of the circumferential wall when the plug is being installed in a passage. The hydraulic plug is characterised in that the cavity of the shell has an internal surface of non-linear shape defining a constricted opening with, internally, a ramp providing a progressively converging approach surface for the head of the expander to be pulled against.

The method of manufacturing a hydraulic plug and the hydraulic plug as described in these last two aspects may comprise any of the optional features of the method and hydraulic plug described above. Thus, the ramp of the hydraulic plug may taper progressively towards the constricted opening. A rate of change of r/x, where r is an internal radius of the cavity and x is displacement along an axis from the sealed end of the shell to the constricted opening, increases towards the constricted opening. In particular, the head of the expander may be shaped to deliver a high Hertz stress value locally at a point of contact with the internal surface of the cavity. It may comprise an axially extending convex surface, at least on a portion arranged to be drawn towards the constricted opening. For example, the head of the expander may comprise a rounded outer surface, e.g., a spherical surface.

Viewed from a further aspect, the present disclosure may be seen to provide a method of sealing a passage with a hydraulic plug as described above, the method comprising: inserting the hydraulic plug in a passage sealed end first with the stem accessible for applying a tensile force; applying a tensile force to the stem to pull the head of the expander against the constricted opening of the shell; sealing the passage by expanding, locally, a region of the circumferential wall with the head of the expander to seal the hydraulic plug against an internal surface of the channel to seal it off, the method being characterised by ironing the region of the shell against the internal surface of the channel during the sealing step.

The stem, or at least a portion thereof, may be arranged to snap off away from the head of the expander when a predetermined tensile force is reached. The head of the expander may then remain trapped within the shell during use of the hydraulic device.

During the applying of a tensile force, a tool may be used which provides a counter reaction load to the open end of the shell to balance the tensile force applied to the stem.

FIGURES

Certain exemplary embodiments will now be described in greater detail by way of example only and with reference to the accompanying figures, in which.

Figure 4A:
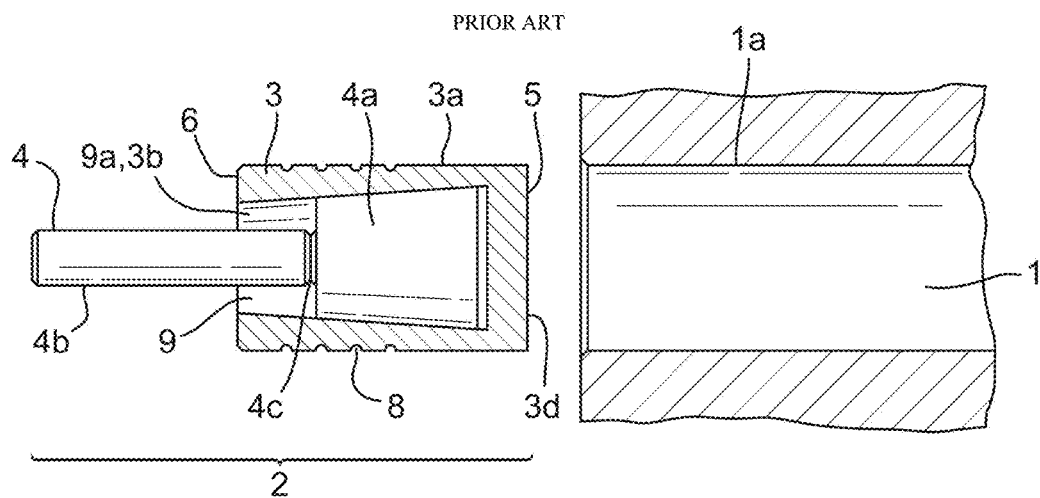
Figure 4B:
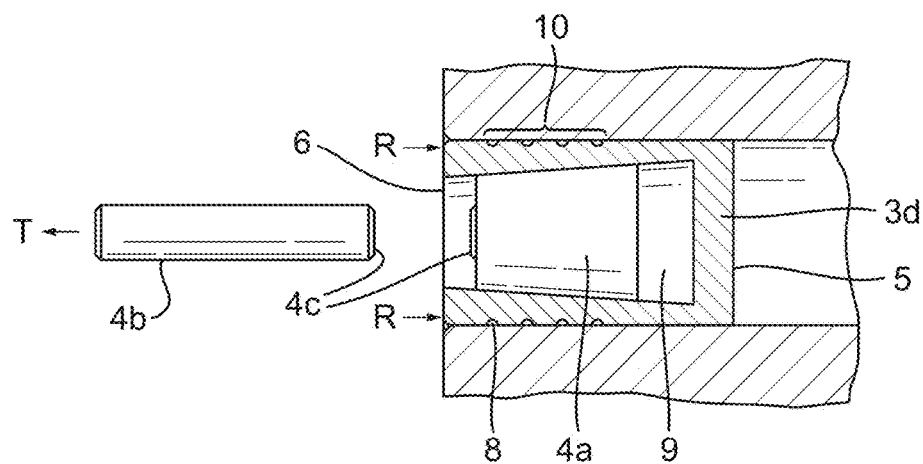
Figure 5A:
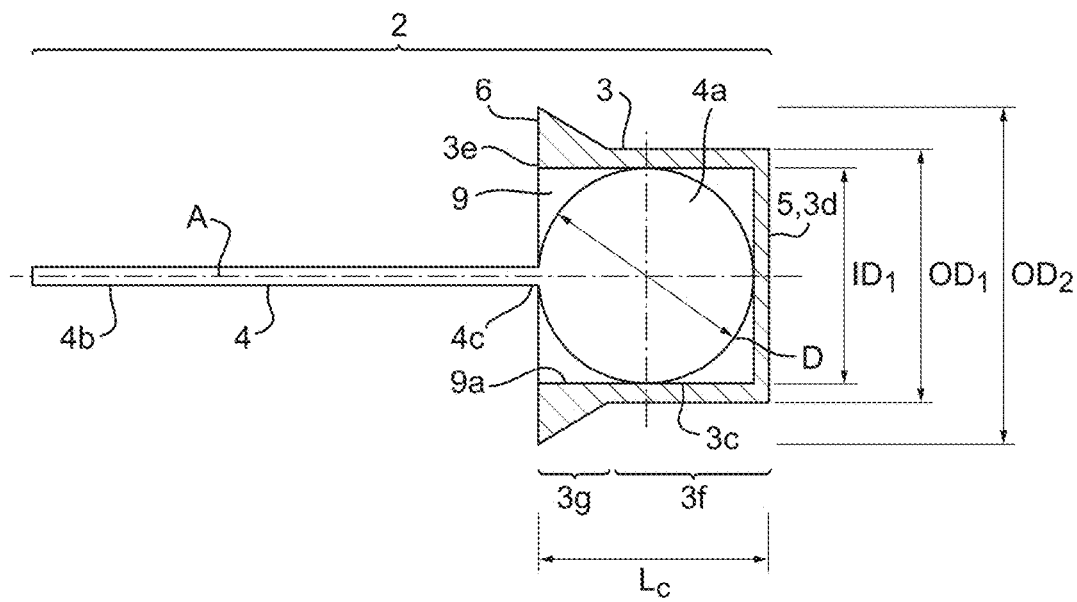
Figure 5B:
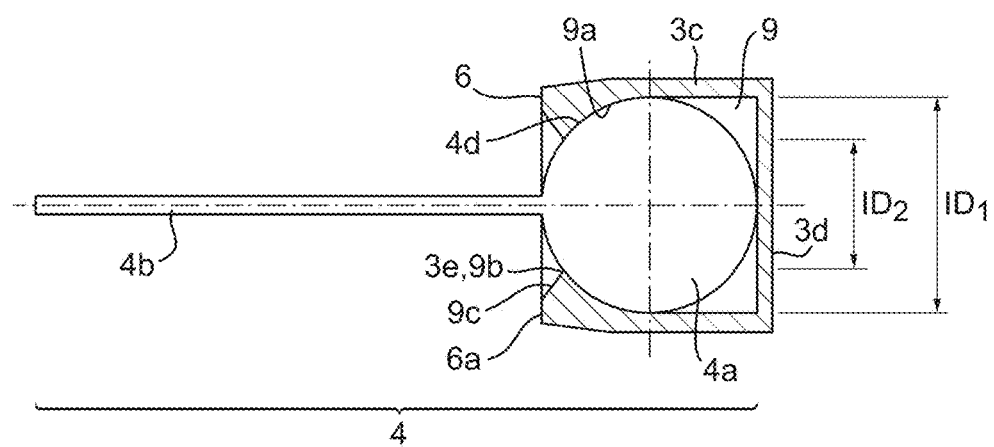
Figure 6A:
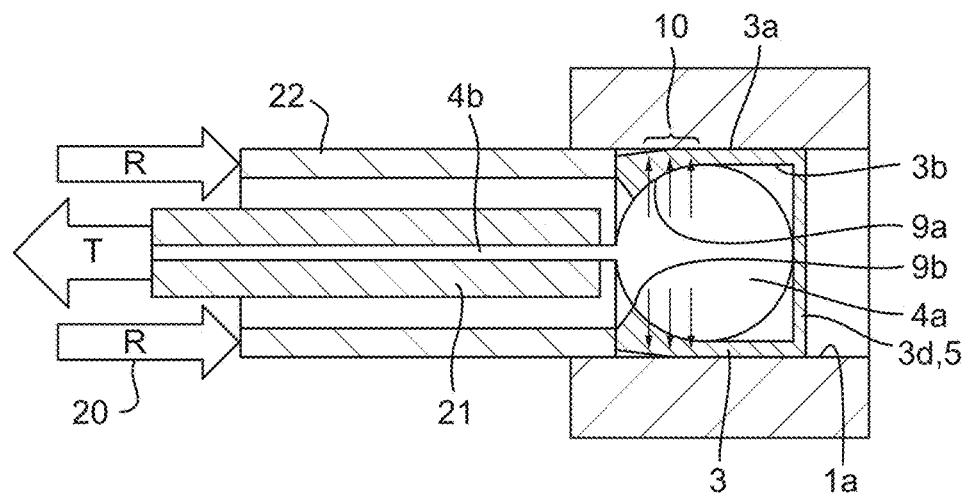
Figure 6B:
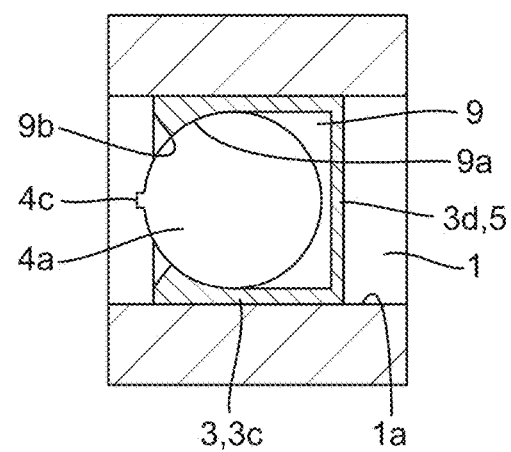
Figure 7A:
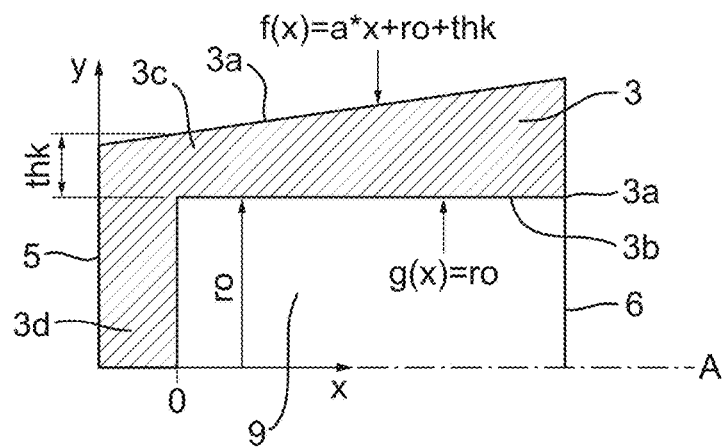
Figure 7B:
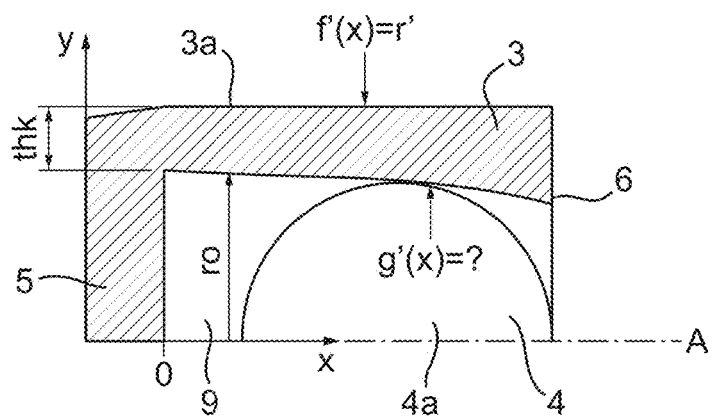
Figure 9A:
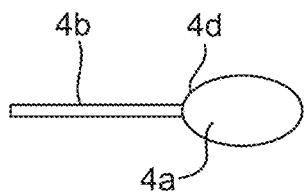

FIGS. 4A and 4B are cross-sectional representations illustrating a hydraulic plug described in U.S. Pat. No. 3,525,365;

FIGS. 5A and 5B are cross-sectional representations of an exemplary hydraulic plug in accordance with the present disclosure during its manufacture and ready for installation within a passage;

FIGS. 6A and 6B are cross-sectional representations illustrating the installation of the hydraulic plug of FIGS. 5A and 5B;

FIGS. 7A and 7B are schematic partial cross-sections through a further exemplary hydraulic plug in accordance with the present disclosure prior to insertion of an expander and after partial-deformation of the shell's opening;

FIG. 8 is a representation illustrating the profile functions of the inner and outer surfaces of the shell in FIGS. 7A and 7B; and FIGS. 9A through to 9F are cross-sectional representations of examples of different shapes of expander which could be used in the hydraulic plug.

DETAILED DESCRIPTION

Figure 1A:
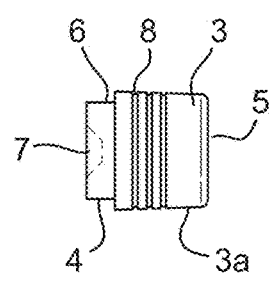
FIG. 1A and FIG. 1B are cross-sectional representations illustrating a first known example of a hydraulic plug.
Figure 1B:
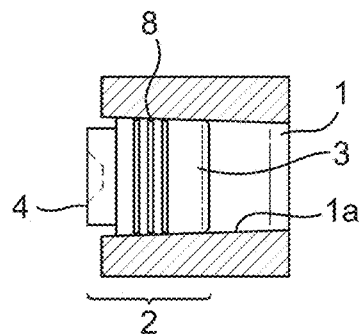

FIGS. 1A and 1B illustrate cross-sectional views of a first main type of known hydraulic plug, with FIG. 1A illustrating the plug prior to insertion and FIG. 1B illustrating the plug after insertion.

FIG. 1B shows a passage 1 in a hydraulic gallery which has been reamed to form a tapered internal surface 1a for receiving the hydraulic plug 2. The plug 2 comprises two parts; an outer part in the form of a shell 3 and an inner part in the form of an expander 4 or "pin". The outer surface 3a of the shell 3 is tapered to correspond to the tapered internal surface 1a of the passage 1. The circumferential wall of the shell 3 is of constant thickness. The shell 3 has a sealed end 5 and an open end 6, with the open end 6 being of larger external diameter than the sealed end 5. The expander 4 comprises a central dimple 7 on its driven end 4a for engagement with a driver tool (not shown). The shell 3 comprises a set of three circumferential grooves 8 which aid the sealing property of the shell 3.

By way of example, for a "7 mm" plug, the internal diameter of the hydraulic passage 1 may be up to 6.5 mm and a taper may be reamed into the internal surface to expand the diameter to greater than 7 mm. The maximum outer diameter of the plug 2 would be in the region of 7 mm and the plug 2 can be provided with a taper of 0.075 mm over the course of a 5.6 mm body length. The expander 4 may extend beyond the open end 6 of the shell 3 by around 3 mm. The central dimple 7 may be around 3 mm wide and have a frusto-conical surface for locating the driving part of a tool.

This is, of course, just one example and the size of the passage 1, shell 3 and expander 4 may vary according to the specific hydraulic device and sealing scenario.

Figure 2:
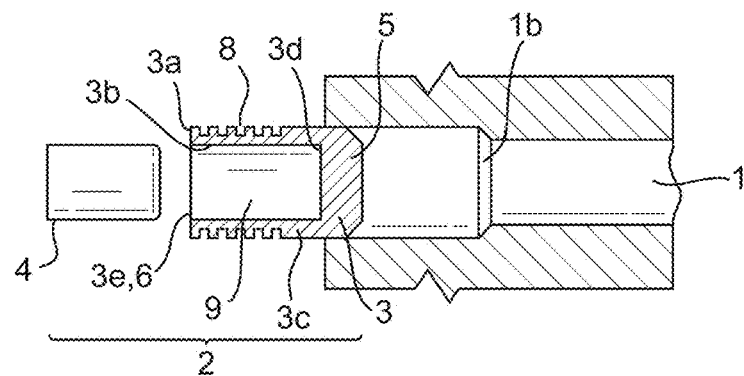
FIG. 2 is a cross-sectional representation illustrating a second known example of a hydraulic plug.

FIG. 2 is an exploded cross-sectional view of a second type of known hydraulic plug 2. In this known example, the passage 1 of the hydraulic gallery is reamed to a constant diameter creating a step 1b where the reamed internal bore meets the passage bore. The hydraulic plug 2 comprises a shell 3 having an outer surface 3a of substantially constant diameter (it may comprise circumferential grooves 8 as shown to aid sealing) and an expander 4 ("pin"). The shell 3 has a sealed end 5, an open end 6 and a cavity 9 opening to the open end 6. The hydraulic plug 2 is installed in the passage 1 by, first of all, pushing the shell 3 into the passage 1 up to the step 1b and then driving the expander 4 into the cavity 9 of the shell 3, to expand the shell 3 against the internal surface 1a of the passage 1 and seal the hydraulic plug 2 within the passage 1 of the gallery.

Figure 3:
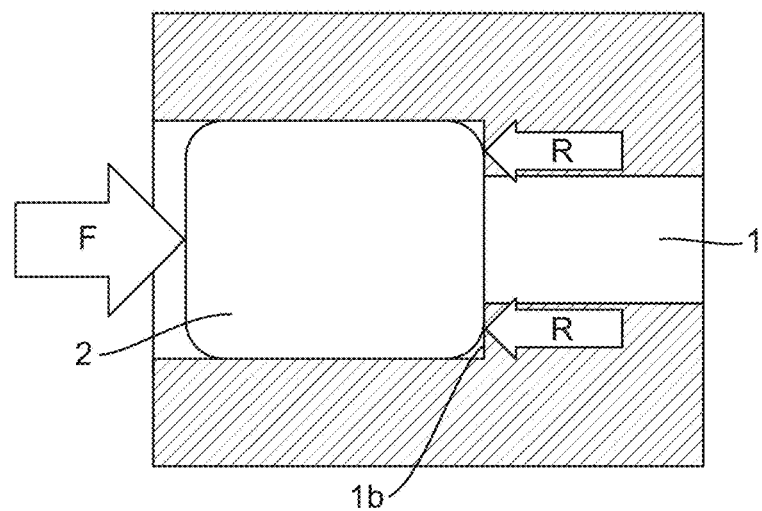
FIG. 3 is a cross-sectional representation illustrating forces and loads within a passage with a known hydraulic plug.

FIG. 3 is a schematic representation illustrating the forces associated with installing a hydraulic plug 2 in a passage 1. Where the plug 2 abuts an internal step 1b of the passage 1, the installation force F generates a counter reaction load R around the edge of the plug 3. Due to the small contact area, the loading in this region can be quite high. As a result, the design of the hydraulic component needs to take into consideration that the axial forces during installation need to be balanced. This can introduce complexity into the design and there is also potential for the high loads to result in material cracking.

FIG. 4A is a cross-sectional view of a hydraulic plug taught in U.S. Pat. No. 3,525,365 prior to installation and FIG. 4B is a cross-sectional view showing the hydraulic plug in place within a passage 1.

As can be seen in FIG. 4A, the known hydraulic plug 2 comprises a cylindrical shell 3 of outer diameter corresponding to the internal diameter of the passage 1. The shell 3 has a cavity 9 with a tapered internal surface 9a which gradually constricts from a sealed end 5 towards the open end 6. The internal surface 9a of the cavity 9 defines a frusto-conical surface for engagement with an expander 4. In other words, the internal surface 9a defines a linear shape; viewed in cross-section along the axis, the internal surface 9a is represented by a straight line.

In this example of the prior art, the expander 4 comprises a frusto-conical head 4a and an elongate stem 4b extending from the head 4a out of the open end 6 of the cavity 9. Thus the head 4a also comprises a linear shape when viewed in axial cross-section; its outer profile is a straight line. In use, the entire length of the head 4a is intended to engage the tapered internal surface 9a of the cavity. Where the stem 4b is joined to the head 4a, a weakened region 4c is provided to initiate a point of fracture when a predetermined tensile load is applied.

During installation, as shown in FIG. 4B, the hydraulic plug 2 is inserted into the passage 1 with the sealed end 5 facing the pressure-side, and when once in place, a tensile force T is applied to the stem 4b to draw the head 4a towards the constricted open end 6 of the shell 3. As the head 4a wedges with increasing force against the tapered inner surface 3b of the shell 3, it expands the outer surface 3a of the shell 3 into sealing contact with the internal surface 1a of the passage 1. There will come a point when the tensile force T matches the predetermined fracture load of the weakened region 4c, causing the expander 4 to break where the stem 4b was joined to the head 4a.

An advantage of this arrangement is that the installation loads are balanced; the tensile force T is countered by a reaction load R applied to the open end 6 of the shell 3. The seal 10 between the outer surface 3a of the shell 3 and the internal surface 1a of the passage 1 corresponds to the length L of the head 4a of the expander 4. Circumferential grooves 8 may be provided in the outer surface 3a of the shell 3 to aid the sealing properties of the hydraulic plug 2.

With the advent of modern hydraulic devices, higher performance sealing is required. In addition, it would be desirable to make the manufacture of the plug parts and the complete hydraulic plug cheaper. The present disclosure may be seen as providing a solution which goes some way to meeting these desires.

FIG. 5A illustrates a cross-section through an exemplary embodiment of a hydraulic plug 2 of the present disclosure during an initial stage of manufacture. The hydraulic plug 2 comprises a shell 3 which has a circumferential wall 3c, a sealed end 5 (provided by end wall 3d), an open end 6 (provided by opening 3e) and a cavity 9 opening to the open end 6. The cavity 9 extends axially within the shell 3 and is initially of constant internal diameter ID1.

The hydraulic plug 2 also comprises an expander 4, and in the case of the FIG. 5A embodiment an expander 4 having a spherical head 4a of a diameter corresponding to the internal diameter ID1 of the cavity (i.e., equal to, or slightly less than the internal diameter ID1 but still with a tight fit) and an elongate stem 4b connected to the head 4a. The stem 4b extends out of the open end 6 of the shell 3 in an axial direction. The expander 4 may comprise a weakened region 4c where the stem 4b joins to the head 4a, in order to promote fracturing in this region when a predetermined tensile force is applied to the stem 4b.

By contrast to the hydraulic plug 2 shown in FIGS. 4A and 4B, the outer surface 3a of the shell 3 is not of uniform diameter. The circumferential wall 3c is also not of uniform thickness. Instead, the shell 3 is wider externally at its open end 6 compared to its sealed end 5.

In the exemplary embodiment of FIG. 5A, the circumferential wall 3c comprises a region 3f of constant thickness adjacent the end wall 3d and a region 3g of increasing thickness adjacent the open end 6. As will be seen below in relation to FIG. 7A, the circumferential wall 3c can comprise other profiles making the shell 3 wider externally at its open end 6 than its sealed end 5 and is not limited to the illustrated shape in FIG. 5A.

The shell 3 may comprise any material suitable for mechanical seals in hydraulic devices, the choice of which may depend on the material of the device that it is being installed in (e.g., for compatibility). Metals like stainless steels, aluminium alloys, titanium alloys, etc., may be chosen accordingly. The chosen metal should also offer suitable corrosion resistance and ductility during forming.

By way of example only, exemplary alloys for the shell could be ductile stainless steels like AISI 300 series or 416. The expander may comprise a harder stainless steel like A304 or A286. The present disclosure is not in any way limited to these materials.

During manufacture, the expander 4 is inserted head first, into the cavity 9 of the shell 3, as shown in FIG. 5A. The diameter D of the head 4a may correspond to the length of the cavity 9 as shown (or the cavity 9 may be longer or shorter as desired).

Thus, in this exemplary embodiment of FIG. 5A, the diameter D of the head 4a equals ID1 and equals the axial length of the cavity Lc. In other words, in the cross-sectional view of FIG. 5A the cavity 9, at least initially, is represented by a square having a side of length D.

With the head 4a of the expander 4 in place within the cavity 9, the outer surface 3a of the shell 3 is then rolled, clamped, or in some other way, deformed plastically around the head 4a in the region 3g adjacent the open end 6 where the circumferential wall 3c is wider. In doing so, material from this region 3g of the circumferential wall 3c is plastically deformed and displaced radially inwards towards the axis A and around the head 4a of the expander 4. This deforming also reshapes the internal surface 9a of the cavity 9, reducing the internal diameter at the opening 3e. It reshapes the internal surface 9a of the cavity 9 from a cylindrical shape to a non-linear shape defining a constricted opening 9b with, internally, a ramp. The ramp 9a provides a progressively converging approach surface for the head 4a of the expander 4 to be pulled against. The constricted opening 9b and ramp 9a retain the head 4a of the expander 4 within the cavity 9, preventing its withdrawal. The shell 3 can be seen to comprise an axisymmetric hollow body having a ramp 9 defining a non-linear surface in the axial direction of the cavity and providing a constricted opening 9b which retains the expander 4.

The outer surface 3a may be rolled or deformed to such an extent that the outer diameter OD2 of the shell 3 in this region 3g becomes less than the outer diameter OD1 of the shell 3 in the un-deformed region 3f extending up to the end wall 3d. The inner surface 3b of the shell 3 (internal surface 9a of the cavity 9) may follow an outer curved surface 4d of the head 4a along a region of the head 4a substantially corresponding to the region 3g of the initially, wider external part of the shell 3.

Thus, in the case of a spherical head 4a, the rolling or clamping operation may only deform 50% or less of the circumferential wall 3c of the shell 3 (the half closest to the open end 6) and leave the remainder with its original form or substantially original form. As part of the rolling or clamping operation, the open end 6 of the shell 3 may be formed to provide a flattened ring 6a of material for engagement with an end of a tool 20, in order to transmit reaction load R (see FIG. 6A).

During the deforming, the opening 3e is bent around the head 4a of the expander 4 to form a constriction or constricted opening 9b, this causing the edge that defined the original opening 3e to become slightly retracted within the shell 3. Thus the deforming may cause the original opening 3e to become countersunk below the new surface of the open end 6.

The deforming of the shell 3 provides the cavity 9 with a ramp 9a or progressively converging approach surface extending from the end wall 3d, or at least from an initial point of contact with the head 4a, to a constriction, namely the constricted opening 9b now corresponding to the material of original opening 3e. The ramp 9a has an internal radial measurement which becomes smaller at an ever-increasing rate in an axial direction from at least an initial point contact with the head 4a towards the constricted opening 9b. Thus the ramp 9a can be seen to taper progressively towards the constricted opening 9b. A rate of change of r/x, where r is an internal radius of the cavity 9 and x is displacement along an axis A from the sealed end 5 of the shell 3 (or at least the initial point of contact with the head 4a) to the constricted opening 9b may increase towards the constricted opening 9b.

On the open end side of the constricted opening 9b, material of the shell 3 is also displaced and collected to provide a counter ramp 9c extending from the constricted opening 9b to a flattened ring 6a, this counter ramp 9c bolstering the retention on the head 4a of the expander 4 within the cavity 9.

To install the hydraulic plug 2 within a passage 1 of a hydraulic gallery, the hydraulic plug 2 is inserted within a passage 1 of substantially the same diameter (i.e., either the same or very slightly smaller diameter) as shown in FIG. 6A. Once in place, a central part 21 of a tool 20 is used to apply a tensile force T on the stem 4b of the expander 4 while at the same time an outer part 22 applies a counter resistance load R to the flattened ring 6a of the open end 6 of the shell 3. The stem 4b may be provided with grooves, ridges or some other form of relief (not shown) to aid gripping by the tool 20. The stem 4b may comprise a rod or wire of metal.

The tensile force T draws the head 4a of the expander 4 against the ramp 9a of the constricted opening 9b, forcing the outer surface 3a of the shell 3 against the internal surface 1a of the passage 1 across a local region 10 where the head 4a acts on the inner surface 3b of the shell 3, e.g., as indicated by the arrows in FIG. 6A. This local region 10 corresponds to only a portion of the expander's head 4a. At a certain point when the tensile force T applied by the central part 21 of tool 20 matches the predetermined breaking load of the expander 4, the stem 4b snaps away from the head 4a, to leave the hydraulic plug 2 sealed within the passage 1 of the hydraulic gallery, as shown in FIG. 6B. Thus the head 4a of the expander 4 remains trapped within the shell 3 during use of the hydraulic device.

During this installation process, as the head 4a is drawn towards the constriction 9b it urges against a ring-shaped area of the ramp 9a, deflecting the shell 3 outwardly at this point (causing the outer surface 3a, where the diameter was OD1, to be urged against the internal surface of the passage 1). Moreover, this action causes the material of the shell 3 to become ironed against the internal surface 1a of the passage 1 in this local region 10, and in so doing, creating strong sealing engagement with the passage 1. The curvature of the head 4a in the axial direction generates high Hertz contact stresses to be developed in the ring-shaped region where the stresses are being transmitted at any one instance, due to the different angles of slope of the head 4a and the ramp 9a, in contrast to the matched taper angles of the conical surfaces of the prior art.

One benefit of the head 4a of the expander 4 having a convex contact surface 4c which is rounded in an axial direction of the cavity is that there is no longer a need for the careful and consistent machining required in the known system to match the conical surfaces of the shell and the expander; instead, the manufacturing of the rounded expander head can be achieved much more simply and in a cost-effective manner.

A second exemplary embodiment of the hydraulic plug 2 is described in FIGS. 7A and 7B. In this embodiment, the shell 3 is shown the other way round in the figure. It has a circumferential wall 3c, a sealed end 5, an open end 6 and a cavity 9 opening to the open end 6. The shell 3 is wider externally at its open end 6 compared to its sealed end 5 as shown in the figure. This is achieved through the thickness of the circumferential wall 3c gradually increasing as it extends from the end wall 3d up to the opening 3e.

In this embodiment, the outer surface 3a of the shell 3 is frusto-conical and the inner surface 3b is cylindrical. The outer and inner surfaces 3a and 3b can be described by the functions:

$$f(x) = a \ast x + ro + thk \qquad \text{[Equation 1]}$$

$$g(x) = ro \qquad \text{[Equation 2]}$$

where f(x) is the function defining the outer surface 3a, g(x) is the function defining the inner surface 3b, x is the displacement along the axis A from the sealed end 5, ro is the inner radius of the shell initially, thk is the thickness of the circumferential wall 3c at the start of the cavity and a is the gradient of the taper on the outer surface 3a. These are linear functions and are represented as straight lines. Similarly the outer and inner surfaces 3a, 3b are straight lines when viewed in axial cross-section.

Thus the outer surface 3a of the shell 3 is not of constant radius, but instead is frusto-conical; it tapers at a regular rate. In this embodiment, by having a radius which varies linearly, it makes it easy to manufacture. The bore of the cavity 9 is of constant radius, again making it easy to manufacture.

In such an arrangement, an elementary volume element dV of the circumferential wall 3a, as a function of x, can be defined by:

$$dV(x) = \pi \ast (f(x)^2 - g(x)^2) \cdot dx \qquad \text{[Equation 3]}$$

Next the head 4a of the expander 4 is placed inside the cavity 9 of the shell 3 and the outer surface 3a is rolled or otherwise deformed to form an outer radius of r', which may be regarded as a function f'(x), where:

$$F'(x) = r' \qquad \text{[Equation 4]}$$

As shown in FIG. 7B, due to plastic deformation and material flow during the rolling operation, the internal wall changes to g'(x). The g'(x) function can be obtained by assuming (i) constant volume of the material, and (ii) the material flows only in a radial direction. The elementary volume element can be defined as dV'. Setting the assumptions as above, the condition dV=dV' must be fulfilled. Therefore:

$$dV(x) = dV'(x) \xrightarrow{solve, g'(x)}$$

$$\left[ \begin{array}{c} \sqrt{r'^2 - 2 \cdot a \cdot x \cdot thk - 2 \cdot ro \cdot a \cdot x - thk^2 - 2 \cdot ro \cdot thk - a^2 \cdot x^2} \\ \sqrt{-(a^2 \cdot x^2) - 2 \cdot a \cdot x \cdot thk - 2 \cdot ro \cdot a \cdot x - thk^2 - 2 \cdot ro \cdot thk + r'^2} \end{array} \right]$$

$$g'(x) = \sqrt{r'^2 - 2 \cdot a \cdot x \cdot thk - 2 \cdot ro \cdot a \cdot x - thk^2 - 2 \cdot ro \cdot thk - a^2 \cdot x^2}$$

The obtained function g'(x) is nonlinear, which means that the head 4a will experience nonlinearity in its contact and a different shape is required accordingly (a cone would not work for example because of the contact conditions). While a ball-shape, in particular a spherical ball, is the most reasonable choice for the head 4a of the expander 4, other shapes are also envisaged which can provide a curved ironing surface to the head 4a, for example, an oval or bullet-shape. Thus the head 4a of the expander 4 may comprise an axially extending convex surface, at least on a portion that is arranged to be drawn towards the constricted opening 9b (its "contact surface" 4d).

The slope of the taper in the figure is by way of example. By changing the slope of the initial outer shell (factor a in the equation of f(x)) the contact conditions may be adjusted as desired.

FIG. 8 is a graphical representation of the functions f(x), f'(x), g(x) and g'(x) shown against the displacement x along the axis A of the shell 3.

FIGS. 9A through to 9F illustrate cross-sectional representations of different examples of expander shape for hydraulic plugs 2. These are in no way intended to be limiting, but rather illustrates the range of shapes that might be possible.

Figure 9B:
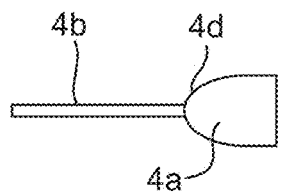
Figure 9C:
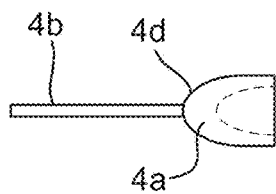
Figure 9D:
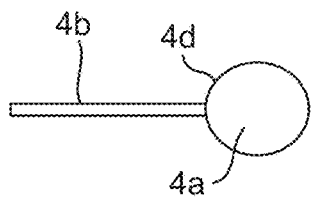
Figure 9E:
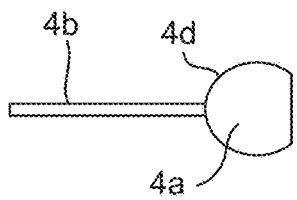
Figure 9F:
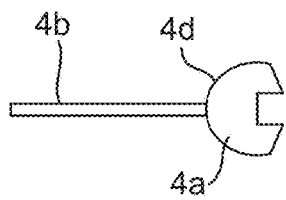

FIG. 9A shows an ovaloid, ball-shaped member providing the expander head 4a. The face closest to the stem 4b defines a convex contact surface 4c which is rounded in an axial direction of the expander 4 (and hence axial direction of the cavity 9). FIG. 9B illustrates a head 4a having the same convex contact surface 4d which blends into a cylindrical flattened end, to define a more bullet-shaped member. FIG. 9C illustrates the same head shape as FIG. 9B but with a cavity in the end furthest from the stem 4b. FIG. 9D illustrates a spherical, ball-shaped member for the head 4a. FIG. 9E illustrates a spherical-shaped member having a flattened surface remote from the stem 4b. FIG. 9F illustrates a modified spherical-shaped member with a groove in a surface remote from the stem 4b.

Additional variations of such shapes and combinations of features are also envisaged and are encompassed within this disclosure. The common feature with all of these embodiments is that the contact surface 4d of the head 4a of the expander 4 is convex and rounded in the axial direction of the cavity/expander. As the contact surface 4d is drawn towards the constricted opening 9b, it will engage the ramp 9a, and through its shape, deliver a high Hertz stress value locally to seal the shell 3 within the passage 1.

At least in the illustrated embodiment, it can be seen that manufacturing costs can be reduced through avoiding the need for matching tapered surfaces on the shell and expander. Improved sealing may also be achieved in order to meet the demands of modern hydraulic galleries. The tensile and reaction forces during installation can be balanced to avoid complications with the design of the device.

The invention claimed is:

1. A method of manufacturing a hydraulic plug comprising:
    providing a shell, the shell comprising a circumferential wall, a sealed end, an open end and a cylindrical cavity opening to the open end, the open end of the shell being wider externally than the sealed end; and
    inserting a head of an expander into the cavity, the expander further comprising a stem that extends out from the cavity for applying a tensile (T) force to the head,
    the method being characterised by:
        in the step of inserting a head of an expander, the expander has a convex contact surface which is rounded in an axial direction (A) of the cavity; and
        plastically deforming a region of the shell adjacent its open end, to form a constricted opening retaining the head of the expander within the cavity.

2. A method as claimed in claim 1, wherein the head of the expander comprises a ball or bullet shaped member.

3. A method as claimed in claim 1, wherein the plastically deforming causes material from the circumferential wall of the shell to be displaced radially inward around the head of the expander, reshaping an internal surface of the cavity to create a ramp on the sealed end side of the constricted opening for the head of the expander to engage.

4. A method as claimed in claim 1, wherein the shell is provided with a frusto-conical outer surface prior to deforming, and/or wherein the deforming produces a substantially cylindrical hydraulic plug wherein the outer diameter $OD_x$ along an axis of the hydraulic plug satisfies the equation $OD_x \leq OD_1$ where $OD_1$ is the outer diameter of the sealed end.

5. A method as claimed in claim 1, wherein the plastically deforming comprises rolling or clamping a region adjacent the open end of the shell.

6. A method as claimed in claim 1, wherein the plastically deforming forms a counter ramp of material on the open side of the constricted opening to bolster the constricted opening.

7. A method as claimed in claim 1, wherein the internal surface of the cavity is deformed to follow an outer surface of the head of the expander.

8. A hydraulic plug for inserting within and sealing a passage of a hydraulic gallery, the hydraulic plug comprising:
    a shell comprising a circumferential wall, a sealed end, an open end and a cavity opening to the open end;
    an expander having a head retained within the cavity of the shell, the expander comprising a stem joined to the head, to which a tensile force (T) can be applied to expand a region of the shell when the plug is being installed in a passage,
    wherein the head of the expander has a convex contact surface that is rounded in an axial direction (A) of the cavity for applying pressure to an internal surface of the cavity, and
    wherein the head of the expander is retained within the cavity by a constricted opening which has been pre-formed by deforming the open end of the shell plastically around the head of the expander during manufacture, whereby the internal surface of the cavity in a region adjacent the constricted opening follows an outer surface of the head of the expander.

9. A hydraulic plug as claimed in claim 8, wherein the head of the expander comprises a ball or bullet shaped member.

10. A hydraulic plug as claimed in claim 8, wherein the cavity has been provided with a ramp on the sealed end side of the constricted opening for the head of the expander to engage, resulting from the plastic deformation of the open end.

11. A hydraulic plug as claimed in claim 10, wherein the ramp defines an internal surface which is non-linear in the axial direction (A) and provides a progressively converging approach surface to the constricted opening within the cavity for the head of the expander to engage.

12. A hydraulic plug as claimed in claim 10, wherein the ramp defines an internal surface which tapers progressively towards the constricted opening such that a rate of change of r/x, where r is an internal radius of the cavity and x is displacement along an axis (A) from the sealed end of the shell to the open end, increases towards the constricted opening.

13. A hydraulic plug according to claim 8, wherein the shell has a substantially cylindrical outer surface such that the outer diameter $OD_x$ along an axis of the hydraulic plug satisfies the equation $OD_x \leq OD_1$ where $OD_1$ is the outer diameter of the sealed end.

14. A hydraulic plug according to claim 10, wherein the head of the expander and the ramp are configured to make a ring of contact that corresponds to less than 50% of an axial extent of the head of the expander.

15. A hydraulic plug according to claim 8, wherein the open end of the shell has been formed to provide a flattened ring-shaped surface for applying a counter tensile load (R) to a tool.

16. A method as claimed in claim 3, wherein the plastically deforming results in an internal surface which tapers progressively towards the constricted opening such that a rate of change of r/x, where r is an internal radius of the cavity and x is displacement along an axis from the sealed end of the shell to the open end, increases towards the constricted opening.

17. A hydraulic plug as claimed in claim 8, wherein the head of the expander comprises a spherical member.

* * * * *